(12) United States Patent
Mueller-Wicke et al.

(10) Patent No.: US 10,831,371 B2
(45) Date of Patent: Nov. 10, 2020

(54) QUOTA CONTROLLED MOVEMENT OF DATA IN A TIERED STORAGE SYSTEM

(71) Applicant: INTERNATIONAL BUSINESS MACHINES CORPORATION, Armonk, NY (US)

(72) Inventors: Dominic Mueller-Wicke, Weilburg (DE); Nils Haustein, Soergenloch (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 138 days.

(21) Appl. No.: 15/859,942

(22) Filed: Jan. 2, 2018

(65) Prior Publication Data
US 2019/0205034 A1 Jul. 4, 2019

(51) Int. Cl.
*G06F 3/06* (2006.01)

(52) U.S. Cl.
CPC ............ *G06F 3/0608* (2013.01); *G06F 3/065* (2013.01); *G06F 3/0619* (2013.01); *G06F 3/0647* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 8,131,784 B1 * | 3/2012 | Zhuge | G06F 16/113 707/823 |
| 8,433,674 B2 | 4/2013 | Takata et al. | |
| 9,026,765 B1 | 5/2015 | Marshak et al. | |
| 9,052,830 B1 | 6/2015 | Marshak et al. | |
| 9,459,973 B2 | 10/2016 | Zimoto et al. | |
| 10,078,639 B1 * | 9/2018 | Faibish | G06F 16/113 |
| 2011/0179247 A1 * | 7/2011 | Mine | G06F 3/0605 711/171 |
| 2013/0212349 A1 * | 8/2013 | Maruyama | G06F 16/11 711/167 |
| 2014/0281214 A1 * | 9/2014 | Rehm | G06F 3/0689 711/112 |
| 2015/0188840 A1 * | 7/2015 | Xiao | G06F 9/50 709/226 |
| 2015/0193154 A1 * | 7/2015 | Gong | G06F 3/0616 711/103 |

* cited by examiner

*Primary Examiner* — Tracy C. Chan
(74) *Attorney, Agent, or Firm* — Griffiths & Seaton PLLC

(57) ABSTRACT

Embodiments of systems and methods are provided for data storage in a tiered storage system comprising at least two storage tiers. A method comprises: providing storage information for each storage tier of the storage tiers to a user. The storage information comprising values of storage parameters, wherein the storage parameters comprise at least one of a storage quota limit of the user, usable storage capacity in the tier for the user based on the storage quota limit, and consumed storage capacity of the tier by the user. The storage information is used to move data between the storage tiers.

17 Claims, 10 Drawing Sheets

QUOTA CONTROLLED MOVEMENT OF DATA IN A TIERED STORAGE SYSTEM

BACKGROUND OF THE INVENTION

Field of the Invention

The present invention relates in general to computing systems, and more particularly, to various embodiments for data storage in a tiered storage system.

Description of the Related Art

Quota allows to limit the storage capacity consumption within a common file system for certain entities, such as user groups and portions of a file system like file sets. Setting quota limit for a certain file system user limits the amount of files or data the user can store in the file system. The quota limit can specify a certain storage capacity the user can consume or it can specify the number of files a user can store. When the quota limit is reached, the user cannot store any more files or data in the file system. To get out of this situation either the user deletes files or the administrator increases the quota limits. However, for a tiered storage system having multiple independent storage tiers, this quota management principle may have limited performance.

SUMMARY OF THE INVENTION

Various embodiments for data storage in a tiered storage system comprising at least two storage tiers are provided. In one embodiment, by way of example only, a method for data storage in a tiered storage system comprising at least two storage tiers is provided. The method comprises: providing storage information for each storage tier of the storage tiers to a user. The storage information comprising values of storage parameters, wherein the storage parameters comprise at least one of a storage quota limit of the user, usable storage capacity in the tier for the user based on the storage quota limit, and consumed storage capacity of the tier by the user. The storage information is used to move data between the storage tiers.

In one aspect, various embodiments are provided for migration of files in a tiered storage system having a plurality of storage tiers. For each storage tier within a tiered storage system and a selected user, storage information may be defined. The storage information may include storage parameters. The storage parameters may include a storage quota limit of the user, usable storage capacity in the tier for the user based on the storage quota limit, and consumed storage capacity of the tier by the user. A migration policy may be defined for determining a target storage tier, a dataset to be migrated in consideration of available target storage tier capacity for the selected user. One or more files from a source storage tier may be migrated to the target storage tier based on occupied storage capacity according to the target storage tier, the storage information for the target storage tier and the migration policy.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
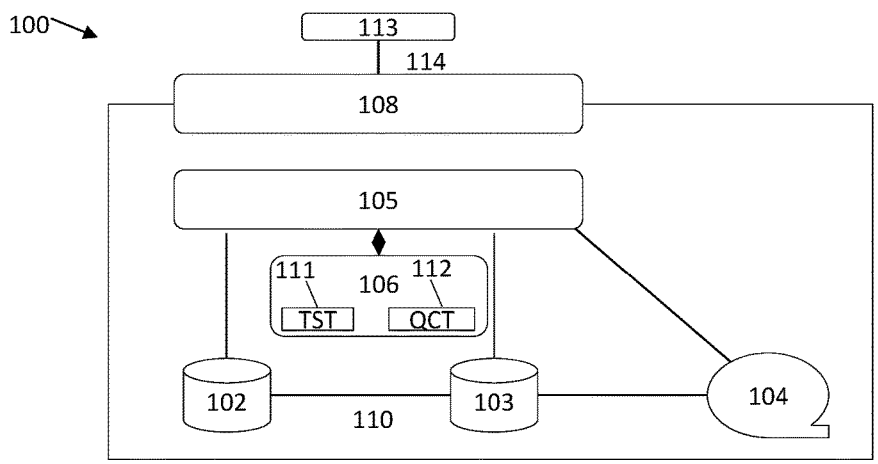
FIG. 1 is a block diagram depicting an exemplary tiered storage system in accordance with the present disclosure.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method may enable an efficient quota management within all storage tiers of a tiered storage system, by coordinating the storage capacity consumption among the storage tiers based on multiple quota limits set for each of the storage tiers. By combining the quota limits of different storage tiers, the present method may enable an efficient usage of storage capacity in the tiered storage system.

The present method may further have the advantage of enabling a systematic and uniform data storage for different storage tiers and different users. The present method may thus be scalable with the size of the tiered storage system.

For example, when quota defined for a given storage tier N is reached, a user gets around this by migrating files to following storage tier N+1. This however can cause unwanted and non-uniform storage capacity usage in such a tiered storage system by certain users and hence increase the cost for storage. This problem may be overcome by the present method as it may enable a systematic and uniform data storage approach for different storage tiers and different users.

In another example, if the user reaches the quota limit of the storage tier N, the user may not be able to store more files, even if there is storage capacity available in the tier N+1 storage. This limits the storage availability because the user is unable to store data. Or, if the user reaches the quota limit of the tier N+1 storage then no files can be migrated anymore causing the storage capacity available for the user in tier N to fill up. The user quota will prevent the full storage tier N from filling up. This problem may be overcome by the present method.

The term "quota" or "quota limit" refers to a maximum amount of storage that is available on a storage tier for use (usable) by a given user. The maximum amount of storage may specify the amount of data (for example in Terabyte) or the number of files for use by a given user. The quota limit may, for example, be a value (e.g., in percent) indicating the maximum amount of storage. In case the quota is defined by the number of files, the maximum amount of storage may be a predefined maximum capacity that can be occupied by that number of files.

The term "user" refers to an entity e.g., an individual, a computer, or an application executing on a computer, a file system, or a directory. The user may, for example, represent a group of users.

The data storage request refers, for example, to the data migration from one source storage tier to one or more target storage tiers or to data placement of a received or created dataset into one of the storage tiers. The placement may occur when data is created or received e.g., from an external system of the present system, and the migration may occur after the data has been created. The term "dataset" refers to a collection of data. The data may be stored in the form of one or more files and/or one or more database tables. The data may, for example, be in the form of rows (records) and columns (fields) and contained in one or more files and/or one or more database tables.

The term "usable storage capacity" or "available storage capacity" of a user refers to a free storage in a given storage tier that the user can use for storing data. The total usable storage capacity is the free storage in all storage tiers of the tiered storage system that the user can use to store data. A consumed or used capacity by a user is the amount of storage of the usable storage capacity of the user that is used by the user for storing data.

According to one embodiment, the storage tiers are organized in a descending level of data access performance, the identifying of the target storage tier in each repetition is performed in accordance with the descending order of the storage tiers. The data access performance comprises speed of the data access and/or Input/Output operations per time interval and/or a latency for each of the read operations. For example, the storage tiers may be numbered from N to N+M, where the higher the number of a storage tier the lower the data access performance of the storage tier (e.g., tier N is a disk, while tier N+M is a tape). For example, the identification of the storage tiers would follow the logical sequence N, N+1, N+2 ... N+M. In case the data storage process is a data placement process, the first identified target storage tier may be tier N, the second identified target storage tier is tier N+1 and so on. In case the data storage process is a data migration process from a source storage tier N, the first identified target storage tier may be tier N+1, the second identified target storage tier is tier N+2 and so on. If in another example, the source storage tier is tier N+3, the identification of the target storage tier may follow the logical sequence N+4→N+5→ ... N+M and/or the inversed logical sequence N+2→N+1→N. In one example, the order in which the storage tiers are identified may be indicated in the received request. For example, the request may indicate to follow the logical sequence N->N+1->N+2. In another example, the request, such as a data recall request, may indicate the reverse logical sequence N+M-> ... ->N+1->N.

This embodiment may enable a systematic migration or placement of data with a controlled and progressive change of data access performance.

According to one embodiment, the data storage request is a data migration request from a source storage tier. The method further comprises: determining a quota consumption ratio for the given user and the source storage tier as the ratio between the consumed storage capacity of the given user and the usable storage capacity in the source storage tier for the given user; wherein the receiving of the request is performed in response to determining that the quota consumption ratio exceeds a maximum allowed occupied space threshold. This may enable an automatic migration of data and an autonomous operation of the tiered storage system.

According to one embodiment, the data storage request is a data migration request from a source storage tier. The determining of the dataset comprises selecting the dataset in the source storage tier based on a predefined selection criterion. The selected dataset comprises one or more data files. The method further comprises: in response to receiving a request for data storage of a given user, triggering a data storage process comprising: a) identifying a target storage tier of the storage tiers; b) determining a dataset of the given user to be moved based on the received request; c) determining a data size of the determined dataset; d) determining the usable storage capacity of the target storage tier using the storage information provided for the target storage tier in association with the given user; e) in response to determining that the data size is smaller than the determined usable storage capacity moving the dataset to the target storage tier, otherwise repeating steps a), d) and e) for a further storage tier of the storage tiers until all storage tiers of the system are identified.

In one aspect, the method further comprises repeating steps b)-e) using a further dataset until the usable storage capacity of the source storage tier of the given user reaches a predefined value. This may, for example, enable the storage of data file by file, wherein in each iteration a file may be stored. The predefined value may, for example, be the minimum amount of usable storage capacity in the source storage tier for the given user. The predefined value may, for example, be 20 GB for a storage capacity assigned to the given user in the source storage tier of 100 GB. This may enable an optimal control of the storage per user.

According to one embodiment, the method further comprises, in response to determining that the data size is higher than each of the determined usable storage capacities, aborting the data storage process. This may prevent unnecessary usage of computational cycles by the data storage process.

According to one embodiment, the data storage request is a data migration request from a source storage tier. The method further comprises in response to determining that the data size is higher than each of the determined usable storage capacities, repeating steps b)-e) using another dataset. This may enable a convergence process and thus may further increase the efficiency of the migration process.

For example, the repetition of steps b)-e) may be performed such that in each repetition the dataset may be selected using a different selection criterion. For example, if there are k different selection criteria, steps b)-e) may be repeated k-1 times (i.e., the first execution of steps b)-e) uses the first selection criterion and repetitions of steps b)-e) use the remaining k-1 selection criteria).

In another example, the repetition of steps b)-e) may be performed such that in each repetition another dataset may be used (e.g., randomly). The number of repetitions may be a predefined maximum number.

According to one embodiment, step c) further comprises comparing the data size of the current determined dataset with the data size of the previously determined dataset and if the data size of the current determined dataset is smaller than the data size of the previously determined dataset performing steps d)-e), otherwise repeating steps b)-c) until all datasets are processed.

According to one embodiment, the storage parameters (also referred to as parameters) further comprise a parameter indicative of a method for accessing the storage tier, wherein the accessing comprises reading the storage parameter value associated with the target storage tier, and using the read value for accessing the target storage tier. This may enable a uniform and systematic migration process. This embodiment may particularly be advantageous for large tiered storage systems with a high number of storage tiers. This embodiment may further have the advantage of avoiding the repetition of a process for discovering the right access method each time a migration of data is to be performed into a given target storage tier.

According to one embodiment, the data storage request is a data migration request from a source storage tier and the storage tiers are organized in a descending level of data access performance, wherein the identified target storage tier has a level smaller than and immediately following the level of the source storage tier. For example, the storage tiers may be numbered from N to N+M, where the higher the number the lower the data access performance (e.g., tier N is a disk, while tier N+M is a tape). In case the source storage tier is storage tier N, the immediately following storage tier having a smaller level is storage tier N+1. This may enable a progressive change in data access performance and thus may increase the quality of the service provided by the tiered storage system.

According to one embodiment, the maximum allowed consumed space is smaller than or equal to 100% of the storage quota limit of the given user in the source storage tier. This may enable the usage of the full storage capacity.

According to one embodiment, the selection criterion comprises at least one of: the selected data files comprise largest files; the selected data files comprise oldest files; the selected data files comprise files having predefined names; and the selected data files consume a pre-defined capacity. The more selection criteria provided the higher the probability the migration process does not end with an error (e.g., by being aborted).

According to one embodiment, the method further comprises updating the storage information of the target storage tier in accordance with the change caused by the storage of the dataset. In case the data storage request is a data migration request from a source storage tier, the storage information of both the source and the target storage tiers may be updated in accordance with the change caused by the migration of the dataset.

According to one embodiment, the method further comprises: detecting a data change in the tiered storage system; updating the storage information in accordance with the detected data change.

According to one embodiment, the data change comprises deletion of a file, wherein the updating comprises: determining the storage tier from which the file is deleted; re-calculating the storage parameters for the determined storage tier; replacing the parameter values in storage information of the determined storage tier and a user of the deleted file by the recalculated values thereby updating the storage information for the determined storage tier and the user of the deleted file. The recalculation of the storage parameters may, for example, be performed by determining the deleted file size such as the file size of the deleted file.

These embodiments may avoid any potential malfunctioning of the system that may result from non-updated information.

According to one embodiment, the method further comprises storing the storage information as at least one data table, wherein the data table has the storage parameters as attributes and has a record per storage tier of the tiered storage system. For example, if the storage information can be stored on a single table, if there are three users of the tiered storage system and three storage tiers in the tiered storage tier, three data tables may be created, one for each user. Each data table may comprise a row for each storage tier. The three data tables may be stored in each of the storage tiers.

According to one embodiment, the storage tiers comprise at least one of solid state drive arrays, flash storage, hard disk drives, optical discs, magnetic tape drives and cloud storage.

According to one embodiment, the method further comprises, in case all storage tiers of the system are identified and the dataset is not moved, outputting an error message. This may, for example, further comprise suggestions of files to be deleted from the tiered storage system by outputting the list of selected files with respective time stamps and the files to be deleted may be highlighted such that the user may select in a safe manner the files to be deleted. The files of the list may be selected based, for example, on their age, last access time stamp, size, owner, etc.

According to one embodiment, the received request is a request for data placement indicative of a dataset to be created in the tiered storage system, wherein the determined dataset is the dataset indicated in the request. For example, the request may comprise an identifier such as the name of each of one or more files of the dataset to be created.

According to one embodiment, the method further comprises, before performing step d): determining the total usable capacity of tiered storage system using the storage information, in case the data size is higher than the determined total usable capacity aborting the data storage process. This may save processing resources that would otherwise be required by identifying and processing one by one the storage tiers for finding the same result i.e., that the dataset cannot be placed.

FIG. 1 depicts a block diagram of a tiered storage system (or tiered file system) 100 comprised of multiple storage tiers 102-104, such as a storage tier N and a storage tier N+M. The storage tiers may logically be coupled together whereby the number of a specific tier in the chain is given by N ($1<=N<=M$). For example, the storage tiers are coupled in a logical sequence, meaning storage tier 102 is followed by storage tier 103 which is followed by storage tier 104. This sequence is reflected in the number N of storage tier N. Each storage tier 102-104 may be represented by a storage technology such as flash, solid state disk (SSD), hard disk, optical disk or tape; or a storage service such as cloud storage service. The tiered storage system 100 may not be limited to three tiers, but can have more tiers.

The storage tiers 102-104 may be organized in a descending level of data access performance. The data access performance comprises speed of the data access and/or Input/Output operations per time interval and/or a latency for each of the read operations. The sequence of storage tiers may be defined based on the level of the data access performance. For example, storage tier 102 has the highest data access performance, followed by the second highest access performance storage tier 103 and storage tier 104 has the lowest data access performance. The higher the number N of storage tier, the lower the data access performance of the storage tier.

The storage tiers 102-104 are inter-connected via a network 110. The tiered storage system 100 provides file level access via file system 108 for users 113. The user may, for example, be operable to issue requests to access (e.g., read, write, etc.) data in the tiered storage system 100. The storage tiers 102, 103 and 104 represent the storage tiers for the file system 108 with different characteristics.

Access to file system 108 can be implemented with common file system protocols such as Network File System (NFS), Simple Message Block protocol (SMB) and POSIX. Alternatively, or in addition, the tiered storage system 100 provides object level access via object storage protocols such as OpenStack Swift or Amazon S3. The users 113 are connected via a network 114 to the tiered storage system 100. The storage tiers 102-104 represent the storage for the file system 108 in the tiered storage system 100.

The storage tier N (102) may be a file system or an object storage with attached storage devices. The storage devices can be based on Flash, SSD or hard disk. The storage tier N+1 (e.g., 103) is provided by one or more file systems, cloud storage systems or hierarchical storage management (HSM) server systems. To provide cost optimization, the storage tier N+1 may store the data on cheap disk based storage systems or tape.

The system 100 further comprises a file management module (FMM) 105 for migrating data (e.g., files) between different storage tiers 102-104 or placing new data in the storage tiers 102-104. The FMM 105 may further be configured to perform the HSM data storage technique such as automatically moving data between high-performance and low-performance storage media.

The FMM 105 may be configured to operate with the data management application programming interface (DMAPI). DMAPI provides a consistent, platform-independent interface for the data management (DM) applications, allowing DM applications to be developed in the same way as ordinary user applications. DM applications include, for example, hierarchical storage management. These applications, which extend the basic OS kernel functions, are characterized by the need for monitoring and controlling the use of files in ways that ordinary users, e.g., 113, do not require. For example, requests such as a request submitted to the file system 108, e.g., by the user 113, to perform a file operation on a file in one of the storage tiers 102-104, may be intercepted and processed using the DMAPI.

The system 100 further comprises a quota management module (QMM) 106 that holds storage information of the storage tiers 102-104. For each storage tier 102-104, the storage information is provided in association with each user of each storage tier. For example, if storage tier 102 has three different users, three sets of storage information may be provided for the storage tier 102 in association with each respective user. The storage information may comprise values of storage parameters. For example, the storage information may be provided in the form of tables 111-112, wherein the storage parameters are attributes of the tables. The storage parameters for each user of the tiered storage system 100 may be stored in two tables 111-112. These tables 111-112 store, for example, quota and capacity information for each storage tier 102-104. Tables 111-112 are further described with reference to FIGS. 2 and 3. For example, tables 111-112 may be provided for each user indicating the storage information of the user in the storage tiers 102-104. For example, table 111 may comprise storage information characterized by a change frequency smaller than a predefined threshold. For example, table 111 may comprise values of the quota per storage tier. Table 112 may comprise storage information that frequently changes such as the available storage in the storage tiers, e.g., the change frequency is higher than the predefined threshold.

The FMM 105 is configured to perform migration (e.g., automatic migration) of files from one storage tier to another or placing files in the appropriate storage tier by respecting quotas. FMM 105 has access to the storage tier N (102), to the storage tier N+1 (103) and the storage tier N+M (104) in order to migrate files between storage tiers and to obtain storage tier capacity utilization information.

When files are written to the tiered storage system 100 by user 113 they may be stored in the storage tier N (102). The FMM 105 later migrates files from the storage tier N (102) to following storage tiers, e.g., storage tier N+1 (103) and vice versa. The migration may be based on capacity thresholds and may select files subject for migration based on file attributes such as name, size, type, access-modification and creation times or user defined attributes. For files that have been migrated from a source storage tier, e.g., the storage tier N (102) to a target storage tier, e.g., the storage tier N+1 (103), metadata associated with the migrated files may be kept in the source storage tier whereas the actual data of the file has been moved to the target storage tier. The metadata of a file includes the path of the file, file name, time stamps (change time (ctime), access time (atime), modify time (mtime)), file size, and permissions and access control lists (ACL) specifying the owning entities of the file and a reference to the storage location in the storage tier. The ctime refers to the time at which changes to file metadata occurred, such as the file's ownership or access permissions. The mtime refers to the time at which changes to the content of a file is performed. The atime refers to the time at which the file was last accessed for read or write. A migrated file may remain presented by its metadata in the file system 108.

The QMM 106 is shown as a separate component of the FMM 105. In another example, the QMM 106 may be part of the FMM 105.

Figure 2:
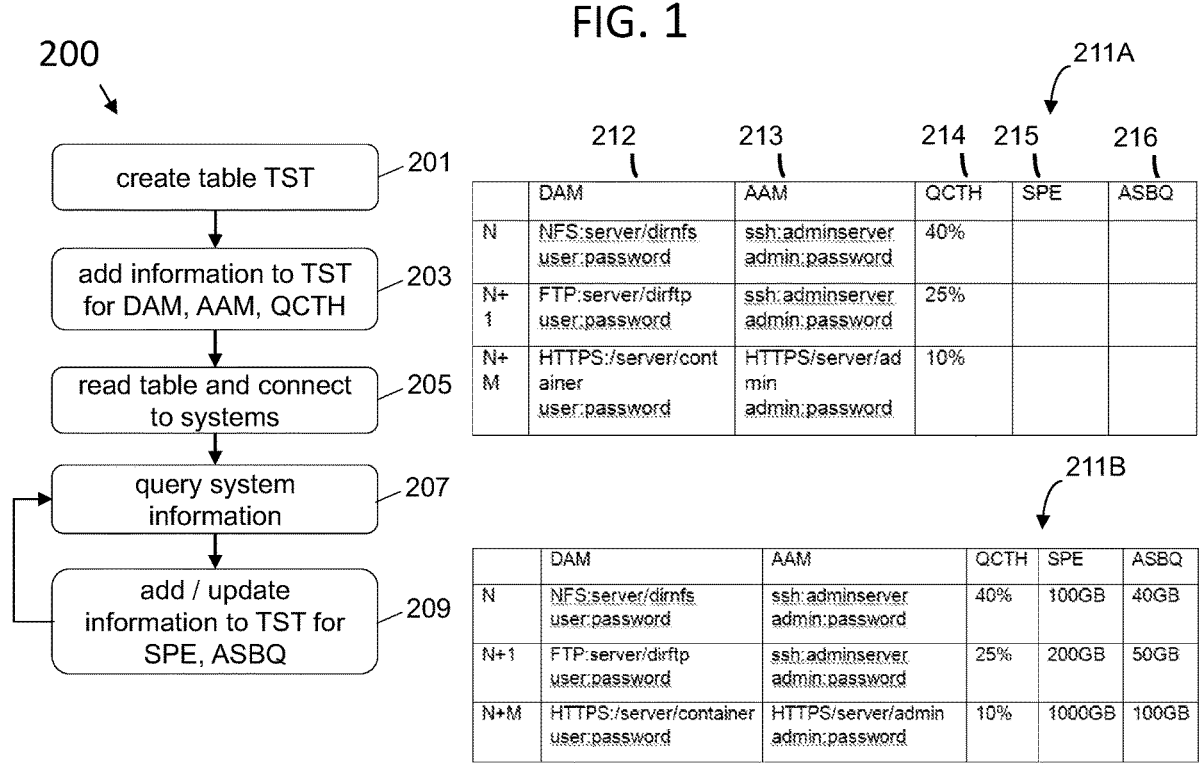
FIG. 2 is a flowchart of a method for creating a first table of storage information according to an embodiment of the present invention.

FIG. 2 is a flowchart of a method 200 for creating table 111 having at least part of storage information of the storage tiers 102-104 for a given user. The table 111 may be referred to as table TST. Tables TST 211A and 211B of FIG. 2 provide an example content of table 111 of FIG. 1. Thus, reference numeral 211A or 211B refers to table 111 of FIG. 1.

In step 201, table TST 211A may be created, e.g., by QMM 106. The table TST 211A may be created for the given user. For example, the table TST 211A may be associated with an identifier (e.g., the name of the table TST 211A) indicating the given user.

Table TST 211A may contain information required for accessing storage tiers 102-104 via its data and admin interfaces, as well as information about usable storage capacity in each storage tier 102-104. Each row of the table TST 211A beyond the first row contains information for one storage tier 102-104. Table TST 211A has as many rows as there are storage tiers available.

The storage tiers are numbered from N to N+M, where the higher the number of a storage tier the smaller the data access performance of the storage tier. For example, storage tier number N refers to storage tier 102, storage tier number N+1 refers to storage tier 103, and storage tier number N+M refers to storage tier 104.

Column DAM 212 in table TST 211A represents parameter "Data Access Method" (DAM) specifying the method for data access to each storage tier 102-104, the path for storing data and the credentials (e.g., for NFS the path may be: nfs:/nfs-server/directory or "NFS:server/dirnfs user:password").

Column AAM 213 in table TST 211A represents parameter "Admin Access Method" (AAM) specifying the method for administrative access to each storage tier 102-104 to obtain administrative information such as capacity consumption, the path for storing data and the credentials (e.g., for an ssh-based administration, the credentials may comprise the following: ssh:adminserver admin:password).

Column QCTH 214 in table TST 211A represents "Quota Consumption Threshold Hard" (QCTH). QCTH is a parameter that defines the maximum usable storage capacity in percent for each storage tier 102-104. For example, a given user may have a quota of 40% of the storage capacity assigned to the given user in storage tier N. Values of column 214 between 0 and 1 or 0% and 100% respectively may be allowed.

The values of columns 212-214 may be received in step 203 as one or more inputs from a user of the system 100. The resulting content of table TST after steps 201 and 203 is shown as the table TST 211A in FIG. 2.

Once table TST 211A has been created for the first time, e.g., by the QMM 106, the FMM 105 uses, in step 205, the values of parameters AAM 213 of table TST 211A in order to connect to storage tiers 102-104 and to query system information in step 207 in order to determine the values of parameter "Storage Per Entity" (SPE) 215 for each of the tiers 102, 103 and 104. SPE is the storage capacity assigned to an entity or user within a given storage tier. The assignment of an SPE to each user may enable an efficient control of storage resources. For example, an administrator of the tiered storage system may create a quota for the SPE of a user to limit the storage space that the user can use. For example, the quota for the SPE of the user may be adapted (increased or decreased) in accordance with the user needs.

The FMM 105 calculates values of parameter "Available Storage By Quota" (ASBQ) 216 for each row by using the following formula and stores this parameter in table TST 211A in step 209. The parameter ASBQ specifies the capacity that is usable per quota limits: (ASBQ=SPE*QCTH). For example, if the given user has a quota (QCTH) of 40% and its assigned storage space in storage tier N is 100 GB, the usable storage capacity (by quota) is 100 GB*0.4=40 GB.

The table TST 211B of FIG. 2 shows content of table TST resulting from the execution of steps 205-209. For example, the table TST 211B has content obtained after the FMM 105 has determined values of the parameters 212-216 and updated the table TST 211A.

The information of table TST 211B may be used and updated by the FMM 105 by repeating steps 207-209, e.g., on a periodic time basis. Part of the information in the table TST 211B may be input or entered by a user of the system 100, e.g., an administrator of the system 100.

Figure 3:
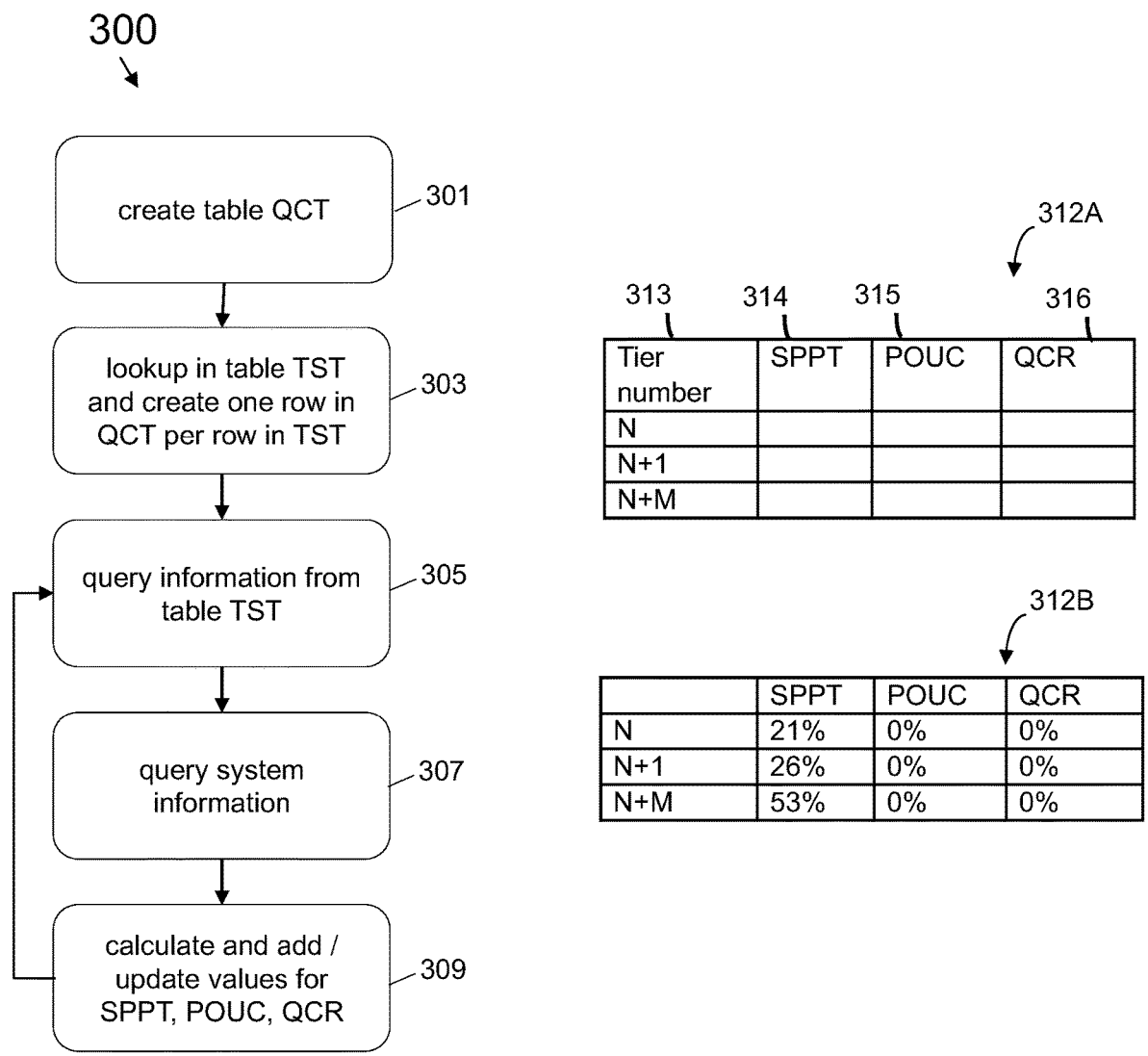
FIG. 3 is a flowchart of a method for creating a second table of storage information according to an embodiment of the present invention.

FIG. 3 is a flowchart of a method 300 for creating table 112 having at least part of storage information of the storage tiers 102-104 for a given user. This table 112 may be referred to as table QCT. Tables QCT 312A and 312B of FIG. 3 provide an example content of table 112 of FIG. 1. Thus, reference numeral 312A or 312B refer to table 112 of FIG. 1.

The QMM 106 may create table QCT 312A in step 301 to store and calculate values of storage parameters used for quota based storage management. The table QCT 312A may be created for the given user. For example, the table QCT 312A may be associated with an identifier (e.g., the name of the table QCT 312A) indicating the given user.

For the calculation of the values of the storage parameters of table QCT 312A, table TST 211B is read in step 303 and one row is created in table QCT 312A for each row in table TST 211B as shown in table QCT 312A. Each row beyond the first row contains information for one storage tier 102-104. Column 313 of table QCT 312A represents the storage tier number.

Column 314 of table QCT 312A represents parameter "Storage Portion Per Tier" (SPPT). This parameter defines the usable storage capacity of each storage tier 102-104 relative to the overall or total usable storage capacity over all storage tiers of the tiered storage system. For example, the value of parameter SPPT for storage tier N for a given user may be obtained by dividing the value of parameter ASBQ of the given user in the storage tier N by the sum of values of the parameter ASBQ of the storage tiers N, N+1 and N+M for the given user (SPPT of storage tier N=21%=40 GB/190 GB).

Column 315 of table QCT 312A represents parameter "Portion Of Used Capacity" (POUC). For a given storage tier, this parameter defines the storage capacity that is used by the user in the given storage tier divided by the sum of usable capacity of the given user in all storage tiers ordered below the given storage tier in addition to the given storage tier (e.g., if the given storage tier is N+2, the sum is over storage tiers N+2, N+3 . . . N+M). This value is used by the FMM 105 to identify if data can be migrated to following storage tiers.

Column 316 of table QCT 312A represents parameter "Quota Consumption Ratio" (QCR). This parameter defines the used capacity for each storage tier by the given user divided by the usable storage capacity of the given user in each storage tier. For example, the QCR is the quotient of consumed or used capacity in byte (dividend) and the usable storage capacity in byte (divisor) per entity. Values between 0 and 1 or 0% and 100% respectively are allowed.

The FMM 105 queries information from the table TST 211B in step 305, such as the values of the parameter AAM 213.

The FMM 105 accesses the storage tiers 102, 103 and 104 in step 307, so as to query system information, using the admin access method information (AAM) from table TST 211B obtained in step 305 and identifies the currently used storage capacity for the given user in this storage tier and calculates the quota consumption ratio QCR for each row using the ASBQ value from table TST 211B using this formula: QCR=used capacity/ASBQ (used capacity divided by the ASBQ value).

In step 309, the values of the parameters QCR, POUC and SPPT are calculated and the table QCT 312A is updated accordingly resulting in table QCT 312B. This step 309 may be performed as follows.

In this example of FIG. 3, since the system is new, all storage tiers are empty, meaning the QCR is 0 as indicated in table QCT 312B. The QMM 106 calculates the values for SPPT which is the percentage of the portion of the overall storage capacity of the whole system relative to the storage tier with this formula: SPPT=ASBQ/sum(ASBQ), where sum(ASBQ) is the sum of ASBQ of the storage tiers N to N+M for the given user.

The QMM 106 updates table QCT with the calculated SPPT values for each storage tier. In the example of table TST 211B, the ASBQ of storage tier N is 40 GB, the ASBQ of storage tier N+1 is 50 GB and the ASBQ of storage tier N+M according to table TST 211B is 100 GB. The sum of all ASBQ is 190 GB. The calculated values for SPPT can be found in table QCT 312B.

The QMM 106 calculates the values for the parameter POUC for a given storage tier as the percentage of the used storage capacity available for the given user over a set of storage tiers, wherein the set of storage tiers comprises the given storage tier and all storage tiers ranked below the given storage tier. For example, for storage tier N the set of storage tiers comprises storage tiers N+N+1+N+M. In another example, for storage tier N+1, the set of storage tiers comprises storage tiers N+1+N+M. The calculation of the parameter POUC may be performed as follows for storage tier N:

A) Go to last row N+M of the table QCT 312B
B) Calculate POUC=SPPT*QCR of that row N+M
C) Go to row N+M−1 (e.g., go to N+M and then subtract "1" from "N+M" to get to N+M−1)
D) Calculate POUC=SPPT*QCR+POUC, where the added POUC value is the one evaluated for the row processed just before (e.g., row N+M is the row processed just before row N+M−1, and row N+M−1 is the row processed just before row N+M−2 (e.g., row N+M subtracted by "2"), etc.)
and repeat C) and D) until the lowest numbered row N of the table QCT 312B is reached.

The QMM 106 updates table QCT with the calculated POUC values for each storage tier. In this example, the result of the calculation in the new system is 0% for all rows written to table QCT 312B.

A process of updating table QCT 312B may be performed by repeating steps 305-309 periodically and/or in response to an environment change such as a new storage tier being added, additional capacity being added to an existing storage tier and/or whenever new data is stored in a storage tier. The table QCT 312B may be updated by FMM 105 or QMM 106.

Figure 4:
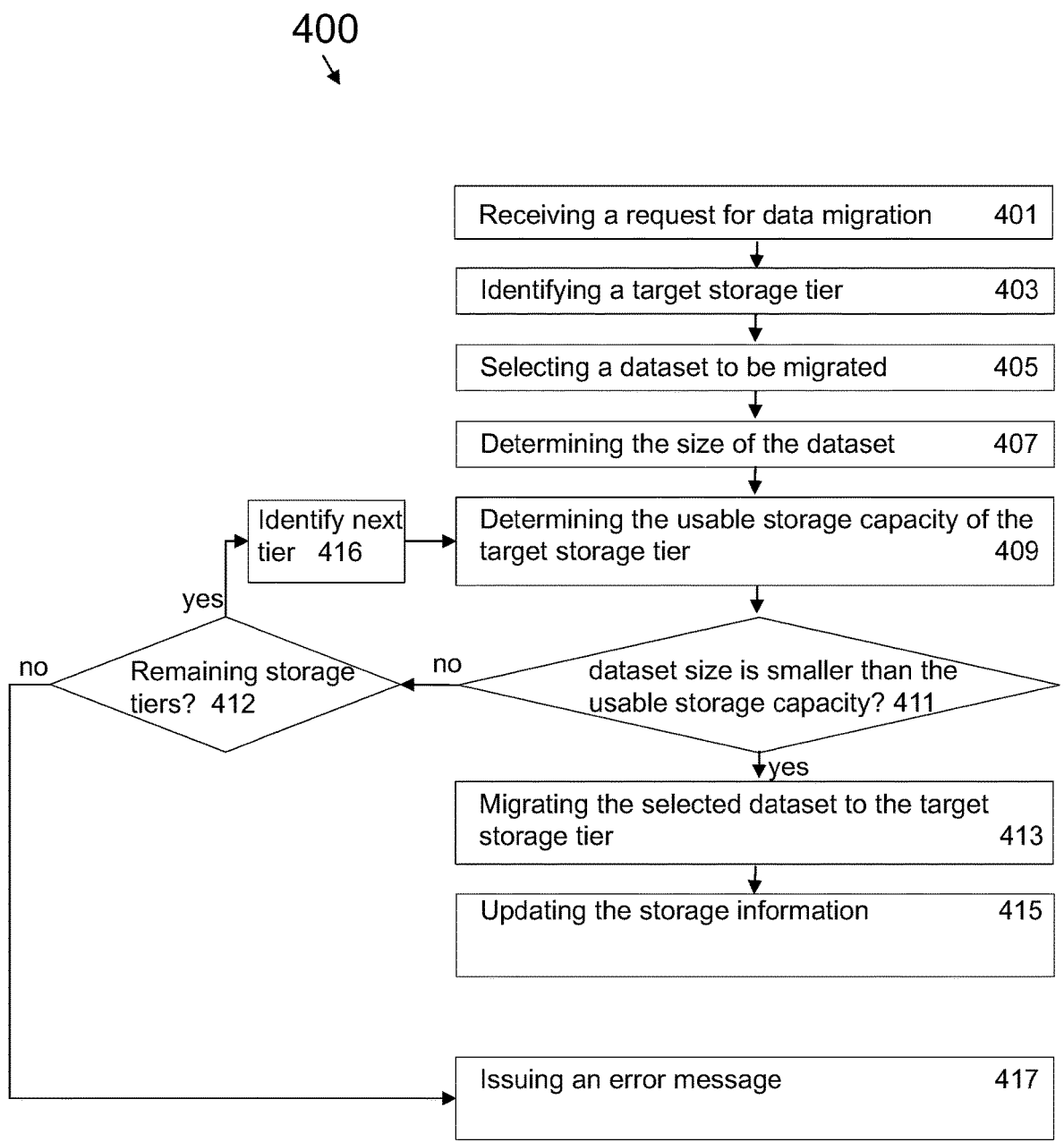
FIG. 4 is a flowchart of a method for data migration in the tiered storage system according to an embodiment of the present invention.

FIG. 4 is a flowchart of a method 400 for data migration in a tiered storage system, e.g., 100.

In step 401, a request for data migration from a source storage tier, e.g., 102, may be received. The data migration concerns data of a given user of the tiered storage system 100. In one example, the source storage tier may be indicated in the request received from a user 113 of the tiered storage system. In another example, the source storage may automatically be determined by detecting that the quota of the given user is exceeded. In yet another example, the source storage tier is automatically detected based on data set names given with the data migration request by determining the storage tier where the data sets are stored.

The request may, for example, be received by the FMM 105. The request may, for example, be sent by the given user, wherein the request comprises an indication of the source storage tier. In another example, the request may be sent by the QMM 106 upon automatically detecting that the QCR for the given user and the source storage tier exceeds a maximum allowed occupied space threshold. And, the source storage tier may automatically be determined by the QMM 106. This may, for example, be done by reading by the QCR the table 112 associated with the pair (the given user, the source storage tier). The maximum allowed occupied space threshold may, for example, be 99%, which means that the source storage tier 102 may require that the given user has at least 1% free space.

In response to receiving the request, steps 403-417 may be performed. The steps 403-415 may form at least part of a migrating process.

In step 403, a target storage tier, e.g., 103, of the storage tiers 102-104 may be identified. The target storage tier is different from the source storage tier. For example, the identification of the target storage tier may be performed in accordance with the logical sequence of the storage tiers 102-104. This means that the storage tier immediately following the source storage tier in the hierarchy may be selected. The identified storage tier may have a lower data access performance compared to the source storage tier.

In another example, the identification of the target storage tier may be performed using the other direction of the logical sequence, i.e., the storage tier immediately preceding the source storage tier in the hierarchy may be selected or identified.

In step 405, a dataset of the given user to be migrated may be selected based on predefined selection criteria. For example, the dataset may comprise one or more files that are selected based on their size or last time of access to the file or last modification time of the file. The selection criteria may require that the largest files be migrated. For example, the FMM 105 may rank the files of the given user in the source storage tier in descending order with respect to their size or last access date and may select the first N ranked files, where N>=1.

In step 407, the data size of the selected dataset may be determined.

In step 409, the usable storage capacity of the target storage tier may be determined using the storage information provided for the target storage tier in association with the given user. For example, the FMM 105 may read table 112 and table 111 of the given user to read the QCR and the ASBQ in the target storage tier. The usable storage capacity may, for example, be determined by the formula ASBQ*(1−QCR).

The FMM 105 may determine (inquiry step 411) if the data size is smaller than or equal to the determined usable storage capacity.

In case the data size is smaller than or equal to the determined usable storage capacity, the selected dataset may be migrated in step 413 to the target storage tier. The migration may, for example, be performed using the data access method (DAM) indicated in the table TST 111 of the given user in association with the target storage tier.

The storage information (e.g., the table QCT 112) of the source and target storage tiers may be updated in step 415 with the new storage consumption values in the source and target storage tiers.

In case the data size is larger than the determined usable storage capacity in step 411 and not all the storage tiers have been processed (inquiry step 412) steps 416 and 409-417 may be repeated for the next target storage tier of the storage tiers until all storage tiers of the system are identified. In step 416, the next storage tier of the storage tiers is identified, e.g., in accordance to the logical sequence of storage tiers.

In one example, in case (inquiry 412) all storage tiers of the system are processed in that for each identified target storage tier the data size was higher than the respective usable storage capacity, an error message may be issued in step 417, e.g., to indicate that the process is unsuccessfully ended.

In another example, in case all tier storage tiers of the system are processed in that for each identified target storage tier the data size was higher than the respective usable storage capacity, steps 403-415 may be repeated by selecting the dataset using another selection criterion than the one used for the first execution of steps 403-415. For example, a smaller dataset in size may be selected a number of times according to the steps 403-415, which may be the number of selection criteria. For example, if the selection criteria comprises three different conditions, the steps 403-415 may be repeated two times (the first execution used the first criterion). In case none of the selected datasets have been migrated, an error message may be sent leaving the content of the given user in the source storage tier as it is.

Figure 5:
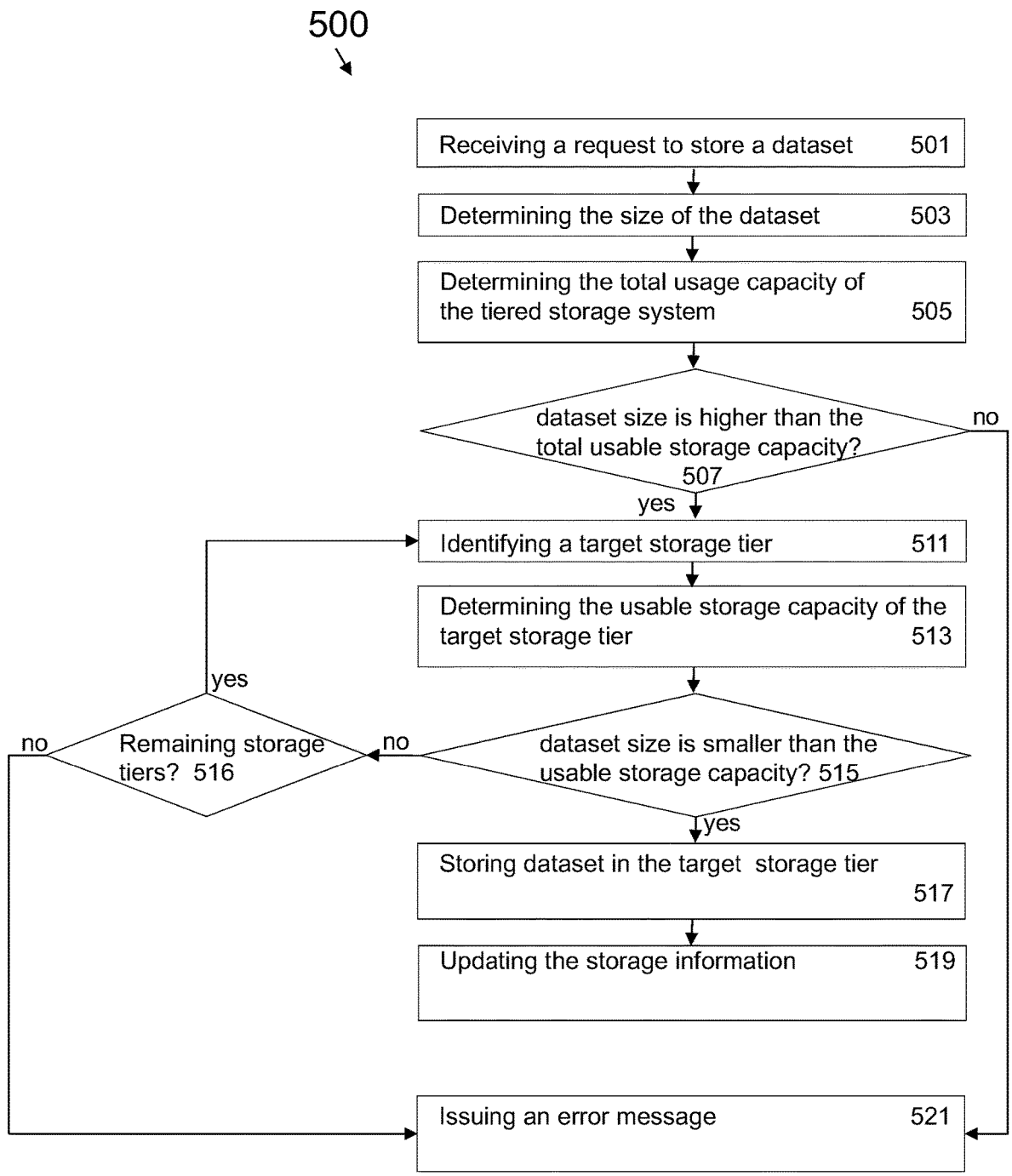
FIG. 5 is a flowchart of a method for data placement in the tiered storage system according to an embodiment of the present invention.

FIG. 5 is a flowchart of a method 500 for data placement in a tiered storage system, e.g., 100.

In step 501, a request to store a dataset may be received. The dataset may belong to a user which may be referred to as requestor. The FMM 105 may, for example, receive or intercept the request. For example, user 113 (e.g., a user application 113) may open one or more files for write or append one or more files in file system 108 and may end with a file close operation that triggers the request received in step 501. The dataset may comprise one or more files.

The FMM 105 may, for example, be configured to register with DMAPI such that the FMM 105 may receive notifications of file close events from the DMAPI, wherein a notification of the notification received by the FMM 105 comprises the request to store the dataset.

In response to receiving the request of step 501, steps 503-521 may be performed. Steps 503-521 may form at least part of a placement process.

In step 503, data size of the dataset to be stored may be determined by the FMM 105. For example, the notification received from the DMAPI by the FMM 105 may comprise a file handle of each file of the dataset. The FMM 105 may use the file handle, to access file attributes such as the file size of files of the dataset.

In step 505, the total usable capacity of the tiered storage system for the requestor may be determined by the FMM 105 using the storage information 111-112. For example, the FMM 105 may read table TST 111 and table QCT 112 to get the values of QCR and ASBQ of the requestor in each storage tier of the tiered storage system. For example, for each storage tier and the requestor, the formula ASBQ*(1−QCR) may be evaluated and the sum of the resulting value is the total usable capacity of the tiered storage system for the requestor under consideration of quota limits assigned to the requestor.

In case (inquiry from step 507) the dataset size is higher than the determined total usage capacity, a target storage tier of the storage tiers may be identified in step 511.

In case (inquiry from step 507) the data size is smaller than or equal to the determined total usage capacity, the placement process may be aborted and an error message may be issued in step 521. The identification of the target storage tier may be performed based on one or more placement policies. For example, if the dataset comprises .doc files, a policy may require that files with ending .doc be stored on storage tier 102. In another example, another policy may require that all files larger than a predefined size (e.g., 5 MB) be stored on storage tier 104. If for example, a .doc file is larger than 5 MB, the other policy may be applied.

In step 513, the usable storage capacity of the target storage tier may be determined by the FMM 105 using the storage information related to the requestor and the identified target storage system. This determination may be performed as described with reference to step 409 of FIG. 4.

In response to determining (inquiry step 515) that the data size is smaller than or equal to the determined usable storage capacity in the identified target storage tier, the dataset may be stored in step 517 by the FMM 105 in the identified target storage tier. The storage information (e.g., table QCT 112) of the requestor may be updated in step 519 for the identified target storage tier as new data (the dataset) has been stored on it.

In response to determining (inquiry step 515) that the data size is higher than the determined usable storage capacity and (inquiry step 516) that not all storage tiers have been processed, steps 511-519 may be repeated. Thereby the next storage tier according to the logical sequence of storage tiers may be selected as a target storage tier in step 511. The repetition may be performed until all storage tiers of the system are identified. If (inquiry 516) after all storage tiers are processed or identified, the dataset was not stored, an error message may be issued in step 521, e.g., to inform the user 113 (e.g., a user application 113).

Figure 6A:
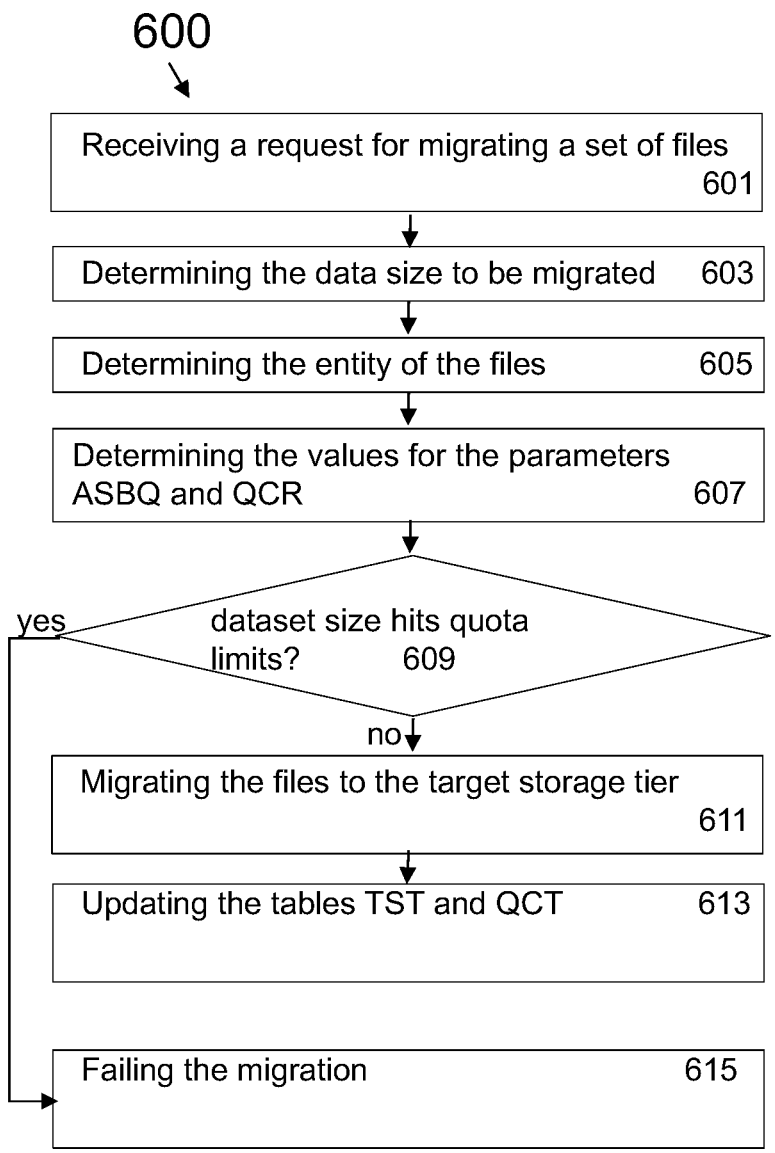
FIG. 6A is a flowchart of another method for migrating files within the tiered storage system according to an embodiment of the present invention.

FIG. 6A is a flowchart of a method 600 for migrating files within a tiered storage system, e.g., 100. Such migration involves a selection of files subject for migration based on file characteristics encoded in attributes, such as last access date, file size or file or path names. Together with the list of files to be migrated the source storage tier (where the files are stored currently) and the target storage tier (where the files should be migrated to) are given. The FMM 105 performs the migration of files from a source storage tier to a target storage tier based on quota setting as follows:

The FMM 105 receives, in step 601, a request for migrating a set of files from one storage tier (source) to another storage tier (target). In one embodiment, the set of files is contained in a list containing the fully qualified path and file names to be migrated.

In response to receiving the request in step 601, the FMM 105 identifies and records, in step 603, the data size to be migrated by accumulating the file size of the list of files.

The FMM 105 determines, in step 605, the entity or the user of the files to be migrated.

The FMM 105 determines, in step 607, values for the parameter ASBQ in table TST and parameter QCR in table QCT of the target storage tier and the determined entity.

The FMM 105 determines (inquiry step 609) if the data size to be migrated fits on the target storage tier without hitting quota limits.

If the data size is smaller than or equal to the usable storage capacity on the target storage tier for the determined entity (i.e., data size<=ASBQ*(1−QCR)), the files may be migrated, in step 611, to the target storage tier using the defined data access method (DAM) in table TST of the determined entity and the target storage tier. Tables TST and QCT of the determined entity may be updated in step 613 with the new storage consumption values in the source and target tiers.

If the data size is higher than the usable storage capacity on the target storage tier for the determined entity in inquiry step 609 (i.e. data size>ASBQ*(1−QCR)), the migration may be failed in step 615 with an error message and the files may be kept in the source storage tier.

Figure 6B:
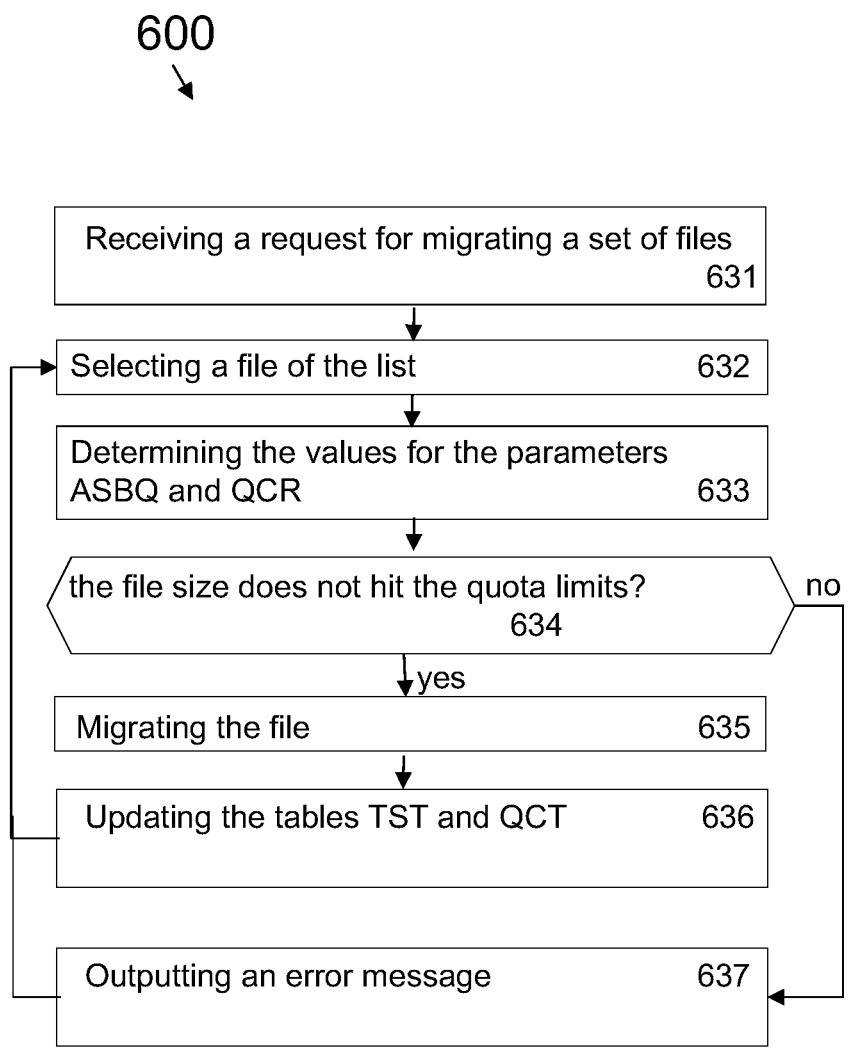
FIG. 6B is a flowchart of another method for migrating file by file within the tiered storage system according to an embodiment of the present invention.

In an alternative example of the method 600, the migration of files by the FMM 105 may be performed file by file as described with a process of FIG. 6B.

The FMM 105 may receive, in step 631, a request for migrating a set of files from one storage tier (source storage tier) to another storage tier (target storage tier). For example, the set of files is contained in a list containing the fully qualified path and file names to be migrated.

Upon receiving the request, the FMM 105 may select (in step 632) a file from the list (starting at the first entry of the list) and determine the size of the file.

The FMM 105 determines (in steps 633) values for ASBQ in table TST and QCR in table QCT of the target storage tier and the entity of the selected file.

The FMM 105 decides (in step 634) if the size of the selected file (file size) to be migrated fits on the target storage tier without hitting quota limits as follows:

If the file size is smaller than or equal to the usable storage capacity on the target storage tier (i.e., file size<=ASBQ* (1−QCR)), the file may be migrated (in step 635) to the target storage tier using the defined data access method (DAM) of table TST associated with the target storage tier and table TST and table QCT may be updated (in step 636) with the new storage consumption values in the source and target storage tiers according to method 300.

If the file size is higher than the usable storage capacity on the target storage tier (i.e., file size>ASBQ*(1−QCR)), the migration may be failed with an error message (in step 637) and the file may be kept in the source storage tier and the process may continue with a next file of the list until all files are processed.

Steps 632-637 may be repeated with a further file of the list until all files of the list are processed.

Figure 7:
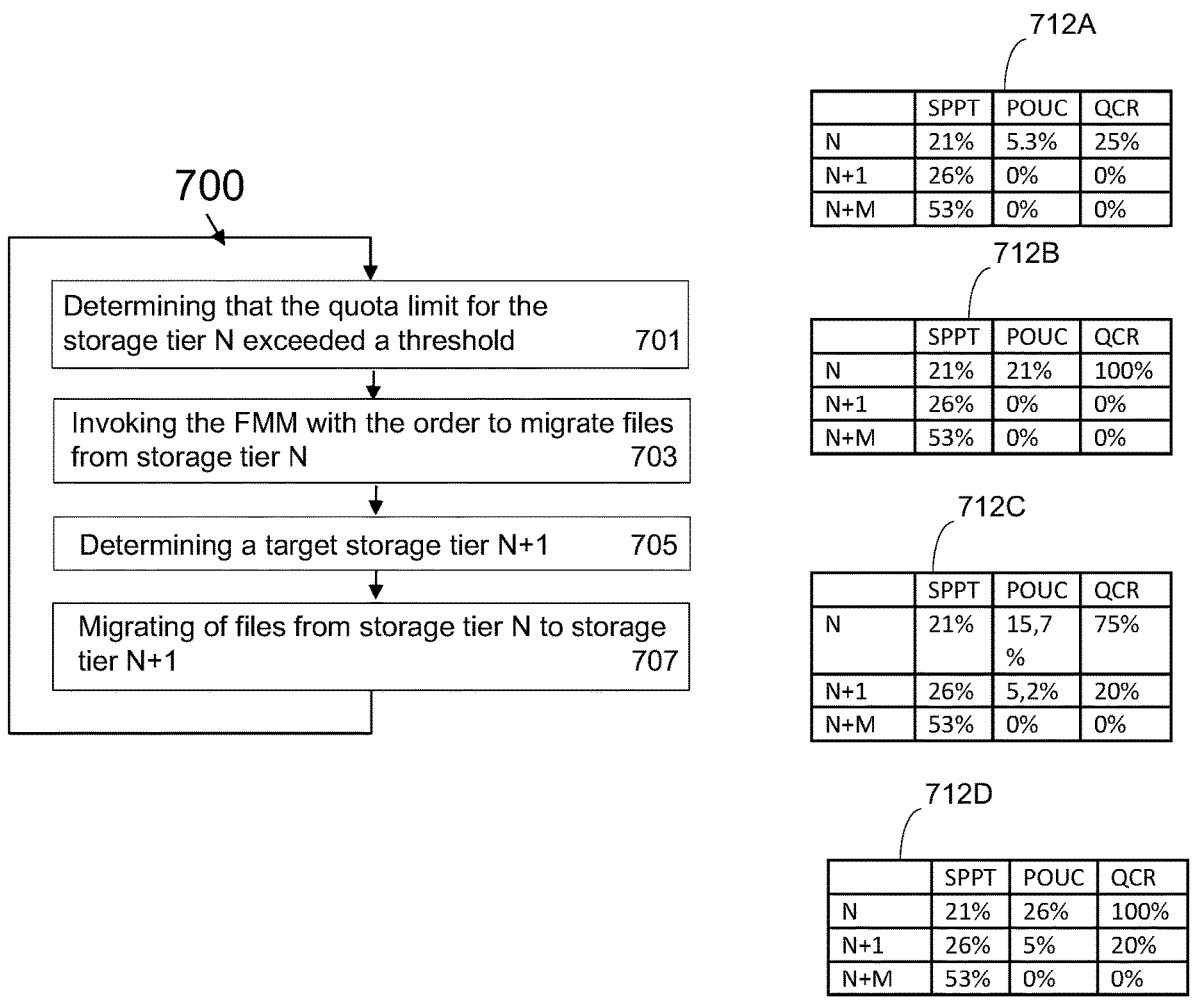
FIG. 7 is a flowchart of a method for automatic migration when the quota limits are reached according to an embodiment of the present invention.

FIG. 7 is a flowchart of a method 700 for automatic migration when the quota limits are reached.

User application or user 113 creates files in file system 108 which changes the storage occupation and capacity metrics in the storage tiers. The QMM 106 and/or FMM 105 periodically update table QCT 112 for each storage tier and entity according to method 300 (e.g., execution of steps 305-309). For example, if the user added a file with a size of 10 GB to storage tier N, the QCT table of FIG. 3 is updated and results in table QCT 712A. The QCR for storage tier N in table 712A is 25% which is the ratio of the used or consumed storage capacity in storage tier N (10 GB) by the user and the ASBQ of the user in the storage tier N (40 GB).

The overall storage capacity consumed by this user in storage tier N is now 5.3%. This refers to the value of POUC for the user in storage tier N which is the ratio of the used or consumed storage capacity in storage tier N (10 GB) by the user and the sum of ASBQ of the user in the set of storage tiers including storage tier N and all storage tiers ranked below the storage tier N (i.e., the sum of ASBQ is 40 GB+50 GB+100 GB=190 GB) and 10 GB/190 GB=5.3%. Whenever new files are added, the QMM 106 and FMM 105 recalculates the values for the QCT table 712A according to method 300. For example, if another 3 files at 10 GB are stored in storage tier N then QCT table 712A is updated and results in QCT table 712B.

QCT table 712B shows that QCR for storage tier N of this entity is 100%. Consequently, the QMM 106 determines in step 701 that the quota limit for the storage tier N exceeded the threshold, e.g., 99% and the QMM 106 invokes, in step 703, the FMM 105 with the order to migrate files from storage tier N. The FMM 105 determines, in step 705, at least one of the target storage tiers for migration, the selection criteria of files subject for migration, and the amount of data to be migrated. This determination may be based on predefined migration rules. For example, a predefined migration rule defines to migrate files from a source storage tier N to a target storage tier N+1 by selecting the largest files first and migrating a specified amount of data. Alternatively, the migration rule may specify to migrate oldest files first or files matching a certain path and file name pattern. The amount of data to be migrated may be specified in Bytes or in percent relative to the capacity of the source storage tier.

For example, the predefined migration rule defines to migrate files from storage tier N to storage tier N+1 by selecting oldest files first until 20% have been migrated and the source storage tier has reach a QCR of 80%. Based on this migration rule, the FMM 105 starts, in step 707, the migration of files from storage tier N to storage tier N+1. The migration may be performed according to method 600. In this example, the first 10 GB file that was added to storage tier N (oldest file) is migrated to storage tier N+1, resulting in QCR=75% for storage tier N. Because the QCR for storage tier N dropped below 80%, the migration stops. After the migration has been done, the FMM 105 updates table QCT 712B for the source and target storage tiers according to method 300 to obtain table QCT 712C.

If the user adds more files, then the QMM and FMM update table QCT 712C according to method 300. For example, if the user adds another 10 GB file, the table QCT 712C is updated and results in table QCT 712D.

If more files are added to storage tier N by the user, the above method 700 continues until there is no free capacity for the user in any storage tier. At this point the quota threshold triggered migration may fail and the user either has to delete data or add storage capacity to any storage tier.

Figure 8:
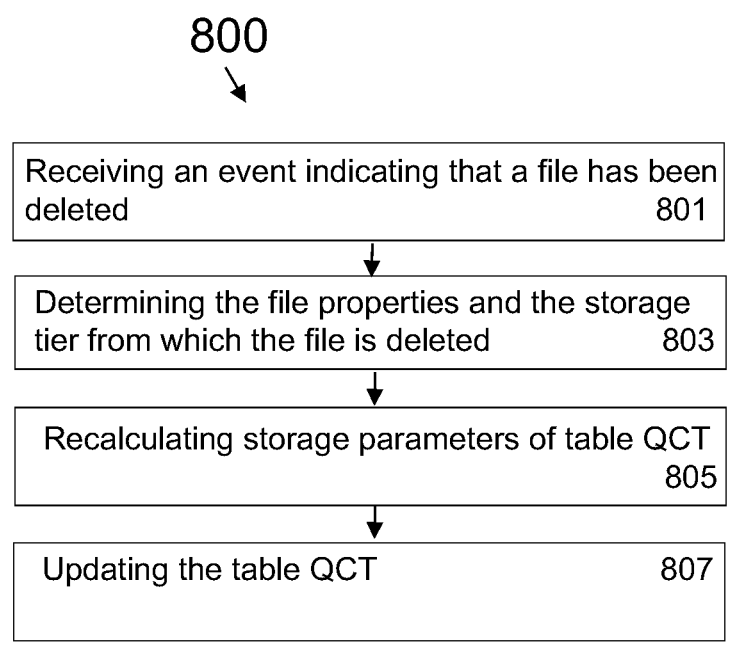
FIG. 8 is a flowchart of a method for adjusting the first table upon a file removal according to an embodiment of the present invention.

FIG. 8 is a flowchart of a method 800 for adjusting table TST 111 upon a file removal.

When a file is removed from the file system 108, it is being removed from one of the storage tiers where it resides. The file system 108 may allow registration of external applications to be informed of file system events for example, using the DMAPI. The FMM 105 registers with the file system 108 to be informed of file removals.

In response to receiving by the FMM 105, in step 801, an event from the file system 108 indicating that a file has been deleted, the FMM 105 determines, in step 803, the file name, file size and the storage tier from which the file is deleted to re-calculate the parameter QCR. In step 805, FMM 105 re-calculates the parameter QCR for the determined storage tier (e.g., using at least part of the steps in method 300) and updates, in step 807, table QCT of the determined storage tier. QMM also re-calculates the parameter SPPT and POUC for the determined storage tier using the steps in method 300 and updates table QCT.

Figure 9:
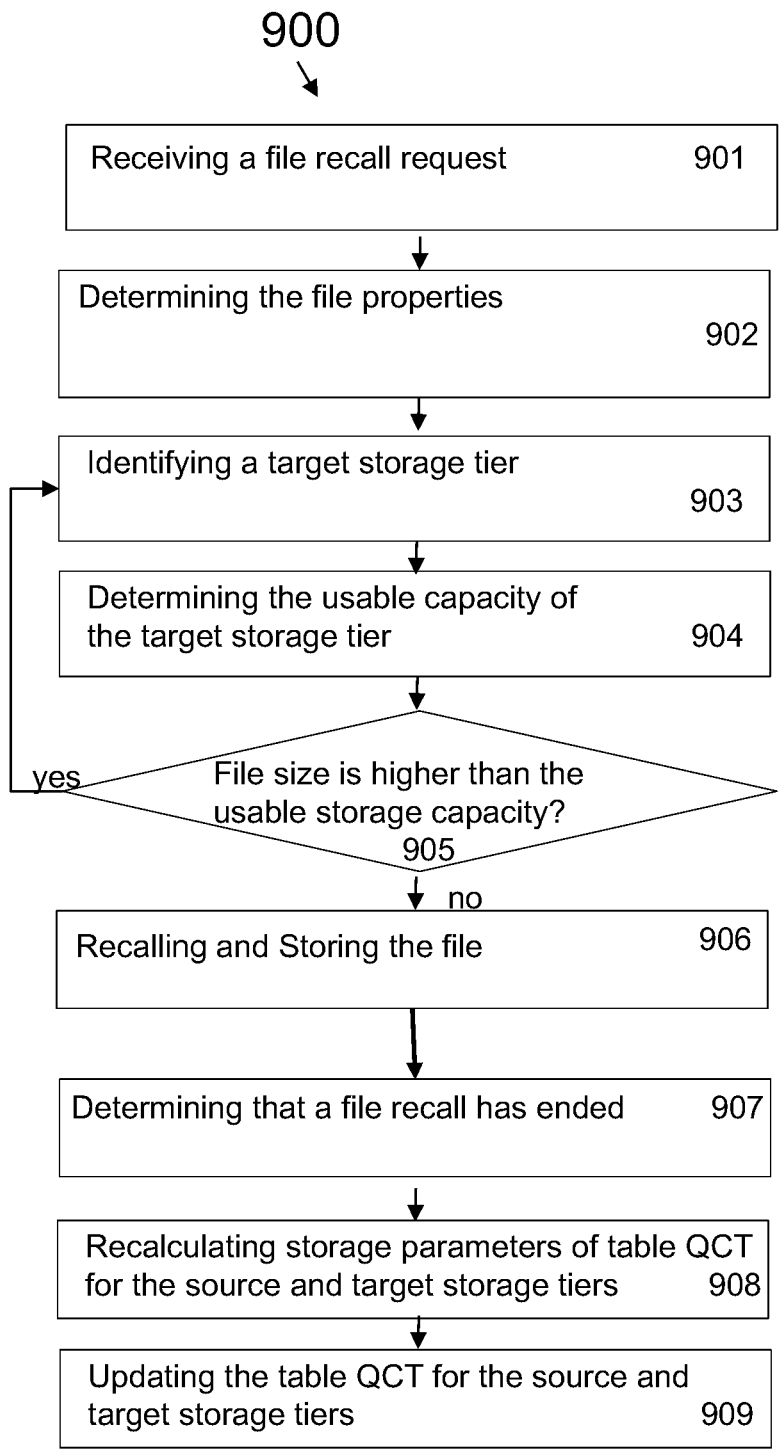
FIG. 9 is a flowchart of a method for adjusting the first table upon a file recall according to an embodiment of the present invention.

FIG. 9 is a flowchart of a method 900 for adjusting table TST upon a file recall for a given user. When a file is being recalled by the FMM 105, it is being moved from one storage tier to another storage tier using a recall policy as described herein. The recall request refers to the copy of a migrated file from a storage tier (e.g., storage tier N+3) back to its originating storage tier (e.g., storage tier N+2). The recall request may thus indicate the order in which the target storage tiers may be identified. In this example, the request indicates that the target storage tiers are to be identified following the reverse logical sequence N+M→ . . . ->N+ 1→N because the recall of the file is from storage tier N+3 to storage tier N+2. In step 901, the FMM 105 receives a recall request including the names of the file(s) and optionally, the target storage tier. The FMM 105 determines, in step 902, the file properties such as the file size, the storage tier where it resides, etc.

In step 903, a target storage tier may be identified. The target storage tier may be given with the recall request. In an alternate embodiment, the target storage tier may be determined based on the reverse logical sequence. Following the above example, the first identified storage tier may be storage tier N+2. However, if the usable storage capacity of the given user in the storage tier N+2 is not enough to store the recalled file, a next storage tier may be identified as described below.

In step 904, the usable storage capacity of the given user in the target storage tier (e.g., N+2) may be determined.

In case (inquiry step 905) the size of the recalled file is larger than the usable storage capacity, a next storage tier may be identified (by repeating steps 903-909) following the reverse logical sequence N+2→N+1→N (e.g., storage tier N+1 may be identified). If none of the identified storage tiers has enough space to store the file, an error message may be output.

In case (inquiry step 905) the size of the recalled file is smaller than or equal to the usable storage capacity, the file may be recalled and stored, in step 906, in the identified target storage tier.

In response to determining by the FMM module 105, in step 907, that the file recall has ended, steps 908-909 may be performed.

In step 908, FMM 105 re-calculates the parameter QCR for the source and target storage tiers (e.g., method 300) and updates table QCT for each of the source and target storage tiers. In step 908, QMM 106 may also re-calculate the parameters SPPT and POUC for the source and target storage tier per the steps in method 300 and update, in step 909, table QCT for each of the source and target storage tiers.

Figure 10:
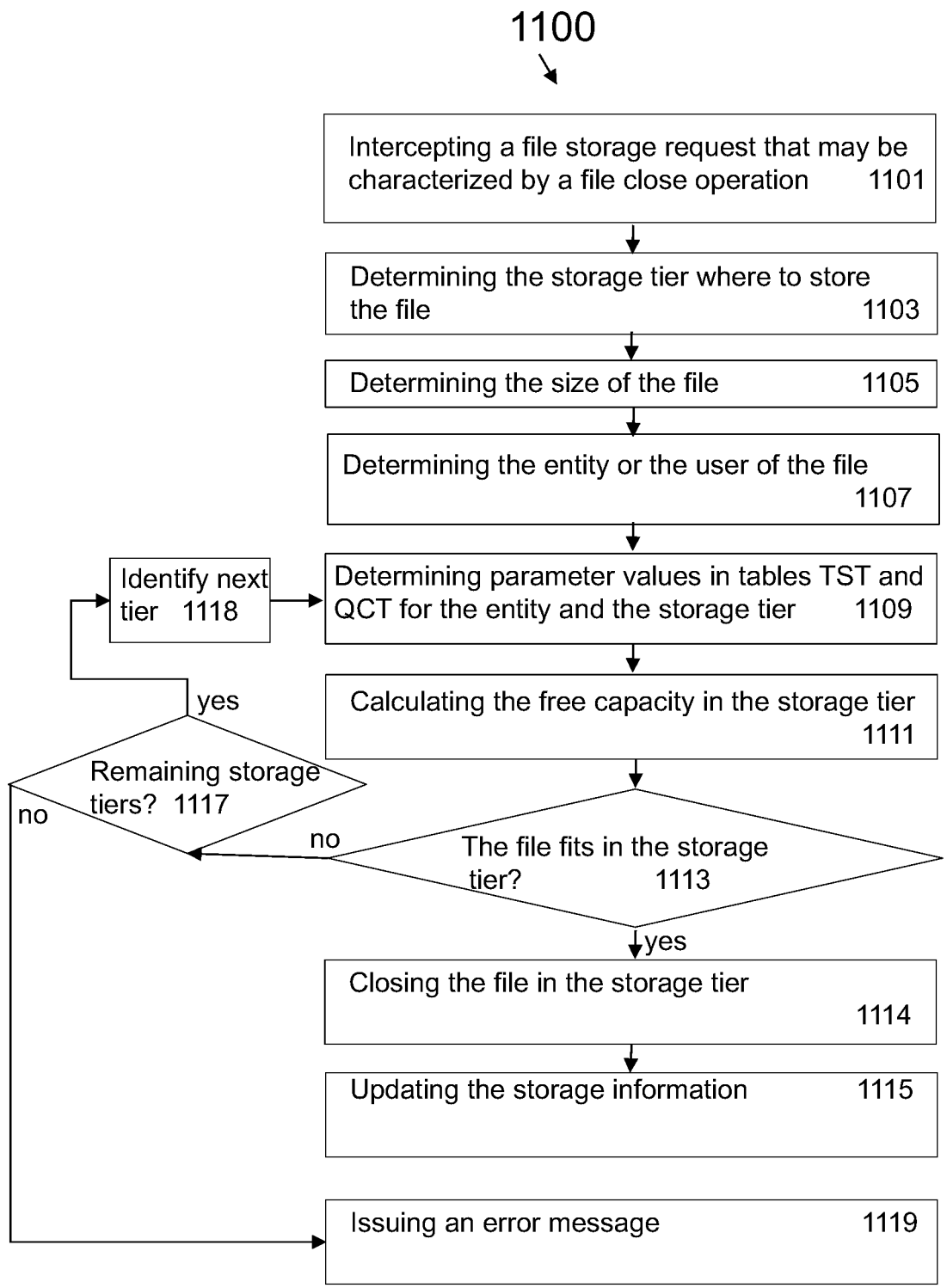
FIG. 10 is a flowchart of a method for file placement, again in which various aspects of the present invention may be implemented.

FIG. 10 is a flowchart of a method 1100 for file placement.

Within a tiered storage system 100, files are placed on one storage tier 102-104 when they are created. Such placement may use placement rules to determine the storage tier for placing a file. The FMM 105 performs the placement of files in one storage tier per the following steps.

The FMM 105 intercepts, in step 1101, a file storage request that may be characterized by a file close operation. Intercepting of a file close operation can be accomplished with file system techniques such as DMAPI. For example, DMAPI may allow the FMM 105 to register for file close events. If the FMM 105 is registered for this event, it gets notified by the DMAPI when a file close operation has been performed in file system 108.

The FMM 105 determines, in step 1103, the storage tier where the file is to be stored based on the placement rules. Placement rules define in which storage tier a file is to be stored. In one embodiment, not only the following storage tiers in the sequence of storage tiers are evaluated for storing the file, but also previous storage tiers are evaluated.

The FMM 105 determines, in step 1105, the size of the file to be stored. This may be performed as the FMM 105 may receive the DMAPI event having a file handle. With this file handle, the FMM 105 may have access to file attributes such as the file size.

The FMM 105 determines, in step 1107, the entity or the user associated with the file to be stored, e.g., the entity that sent the file storage request. The entity may be the entire file system 108, a path within the file system, or a user or group 113.

The FMM 105 determines, in step 1109, the values for parameter ASBQ for all storage tiers in table TST 111 and POUC in table QCT 112 for the determined entity and the determined storage tier where the file is to be placed.

The FMM 105 calculates, in step 1111, the usable or free capacity in the determined storage tier. For that, the FMM 105 queries table TST of the determined entity at the row of the determined storage tier and calculates the sum of all values in column ASBQ and multiplies it with the value for POUC in table QCT for the determined storage tier (e.g., storage tier N) to obtain the remaining or free capacity: Remaining capacity=(sum(ASBQ)*POUC[N]).

The FMM 105 determines (inquiry step 1113) if the file fits into the determined storage tier by comparing the file size against the free capacity.

If the file size is smaller than or equal to the free capacity, the file may be allowed to be closed and stored in the storage tier (step 1114), and tables TST and QCT of the determined entity may be updated in step 1115 with the new storage consumption values in the source and target tier. The method may end.

If the file size is larger than the free capacity and not all the storage tiers have been processed (inquiry step 1117), steps 1118, 1109-1119 may be repeated for the next storage tier that is selected based on the logical sequence of storage tiers in step 1118. If in inquiry step 1117 it is determined that there is no next storage tier, an error to the file close operation may be returned in step 1119 and the method may be ended.

Thus, as provided herein, the present invention provides for various embodiments for data storage in a tiered storage system and computer program product. Embodiments of the present invention can be freely combined with each other if they are not mutually exclusive.

In one aspect, the invention relates to a method for data storage in a tiered storage system comprising at least two storage tiers. The method comprises: providing, for each storage tier of the storage tiers (and for users of the system), storage information comprising values of storage parameters, wherein the storage parameters comprise at least one of a storage quota limit of the user, usable storage capacity in the tier for the user based on the storage quota limit, and consumed storage capacity of the tier by the user. In response to receiving a request for data storage of a given user, triggering a data storage process comprising: a) identifying a target storage tier of the storage tiers; b) determining a dataset of the given user to be moved (or to be stored) based on the received request; c) determining a data size of the determined dataset; d) determining the usable storage capacity of the target storage tier using the storage information provided for the target storage tier in association with the given user; e) in response to determining that the data size is smaller than the determined usable storage capacity, moving the dataset to the target storage tier, otherwise repeating steps a), d) and e) for a further storage tier of the storage tiers until all storage tiers of the system are identified.

In another aspect, the invention relates to a computer program product comprising a computer-readable storage medium having computer-readable program code embodied therewith, the computer-readable program code configured to implement all steps of the method according to preceding embodiments.

In another aspect, the invention relates to a tiered storage system comprising at least two storage tiers. For each storage tier of the storage tiers (and for a user of the system), storage information, comprising values of storage parameters, may be provided. The storage parameters may comprise at least one of a storage quota limit of the user, usable storage capacity in the tier for the user based on the storage quota limit, and consumed storage capacity of the tier by the user. The system may: in response to receiving a request for data storage of a given user, triggering a data storage process comprising: a) identifying a target storage tier of the storage tiers; b) determining a dataset of the given user to be moved based on the received request; c) determining a data size of the determined dataset; d) determining the usable storage capacity of the target storage tier using the storage information provided for the target storage tier in association with the given user; e) in response to determining that the data size is smaller than the determined usable storage capacity, moving the dataset to the target storage tier, otherwise repeating steps a), d) and e) for a further storage tier of the storage tiers until all storage tiers of the system are identified.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figs. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for migration of files in a tiered storage system having a plurality of storage tiers, comprising:
defining, for each storage tier within a tiered storage system and a selected user, storage information, wherein the storage information includes storage parameters, wherein the storage parameters include a storage quota limit of the user, usable storage capacity in the tier for the user based on the storage quota limit, and consumed storage capacity of the tier by the user;
defining a migration policy for determining a target storage tier, a dataset to be migrated in consideration of available target storage tier capacity for the selected user;
migrating files from a source storage tier to the target storage tier based on occupied storage capacity according to the target storage tier, the storage information for the target storage tier and the migration policy; and
determining a quota consumption ratio for the selected user and the source storage tier as a ratio between the consumed storage capacity of the selected user and the usable storage capacity in the source storage tier for the selected user, the quota consumption ratio of the selected user comprising a first user being different than the quota consumption ratio of a second user; wherein the consumed storage capacity comprises a storage capacity used by the selected user in the source tier divided by a sum of capacity used by the selected user in all tiers ordered below the source storage tier in addition to the source tier; and wherein receiving of a request for migration of the dataset is performed in response to determining that the quota consumption ratio exceeds a maximum allowed used space threshold.

2. The method of claim 1, further including:
receiving a request for data storage for the selected user, wherein the received request is a request for data placement indicative of a dataset to be placed in the tiered storage system;
identifying the target storage tier of the storage tiers;
determining the dataset of the selected user to be migrated based on the received request, wherein the determined dataset is the dataset indicated in the request;
determining a data size of the dataset;
determining usable storage capacity of the target storage tier using the storage information provided for the target storage tier in association with the selected; and
migrating the dataset to the target storage tier in response to determining that the data size is smaller than the determined usable storage capacity.

3. The method of claim 2, further including identifying the target storage tier according to a descending order of the storage tiers, wherein the storage tiers are organized in a descending level of data access performance, wherein the request is a data migration request from the source storage tier, wherein the identified target storage tier has a level smaller than the level of the source storage tier.

4. The method of claim 2, wherein determining the dataset further includes selecting the dataset in the source storage tier based on a predefined selection criterion, wherein the selected dataset comprises one or more data files.

5. The method of claim 1, further comprising updating the storage information of the target storage tier in accordance with a change caused by storage of the dataset.

6. The method of claim 1, further comprising:
detecting a data change in the tiered storage system;
updating the storage information in accordance with the detected data change, wherein the updating comprises:
determining the storage tier from which the file is deleted;
re-calculating the storage parameters for the determined storage tier; and
replacing the parameters values in storage information of the determined storage tier and a user of the deleted file by the recalculated values thereby updating the storage information for the determined storage tier and the user of the deleted file; and
storing the storage information as at least one data table, wherein the data table includes the storage parameters and a record of each of the storage tiers of the tiered storage system.

7. A system for migration of files in a tiered storage system having a plurality of storage tiers in a computing environment, comprising:
one or more computers with executable instructions that when executed cause the system to:
define, for each storage tier within a tiered storage system and a selected user, storage information, wherein the storage information includes storage parameters, wherein the storage parameters include a storage quota limit of the user, usable storage capacity in the tier for the user based on the storage quota limit, and consumed storage capacity of the tier by the user;
define a migration policy for determining a target storage tier, a dataset to be migrated in consideration of available target storage tier capacity for the selected user;
migrate files from a source storage tier to the target storage tier based on occupied storage capacity according to the target storage tier, the storage information for the target storage tier and the migration policy; and
determine a quota consumption ratio for the selected user and the source storage tier as a ratio between the consumed storage capacity of the selected user and the usable storage capacity in the source storage tier for the selected user, the quota consumption ratio of the selected user comprising a first user being different than the quota consumption ratio of a second user; wherein the consumed storage capacity comprises a storage capacity used by the selected user in the source tier divided by a sum of capacity used by the selected user in all tiers ordered below the source storage tier in addition to the source tier; and wherein receiving of a request for migration of the dataset is performed in response to determining that the quota consumption ratio exceeds a maximum allowed used space threshold.

8. The system of claim 7, wherein the executable instructions further:
receive a request for data storage for the selected user, wherein the received request is a request for data placement indicative of a dataset to be placed in the tiered storage system;
identify the target storage tier of the storage tiers;

determine the dataset of the selected user to be migrated based on the received request, wherein the determined dataset is the dataset indicated in the request;

determine a data size of the dataset;

determine usable storage capacity of the target storage tier using the storage information provided for the target storage tier in association with the selected; and migrate the dataset to the target storage tier in response to determining that the data size is smaller than the determined usable storage capacity.

9. The system of claim 8, wherein the executable instructions further identify the target storage tier according to a descending order of the storage tiers, wherein the storage tiers are organized in a descending level of data access performance, wherein the request is a data migration request from the source storage tier, wherein the identified target storage tier has a level smaller than the level of the source storage tier.

10. The system of claim 8, wherein the executable instructions, pursuant to determining the dataset, further select the dataset in the source storage tier based on a predefined selection criterion, wherein the selected dataset comprises one or more data files.

11. The system of claim 7, wherein the executable instructions further update the storage information of the target storage tier in accordance with a change caused by storage of the dataset.

12. The system of claim 7, wherein the executable instructions further:

detect a data change in the tiered storage system;

update the storage information in accordance with the detected data change, wherein the updating comprises:
 determining the storage tier from which the file is deleted;
 re-calculating the storage parameters for the determined storage tier; and
 replacing the parameters values in storage information of the determined storage tier and a user of the deleted file by the recalculated values thereby updating the storage information for the determined storage tier and the user of the deleted file; and store the storage information as at least one data table, wherein the data table includes the storage parameters and a record of each of the storage tiers of the tiered storage system.

13. A computer program product for migration of files in a tiered storage system having a plurality of storage tiers with a computing environment by a processor, the computer program product comprising a non-transitory computer-readable storage medium having computer-readable program code portions stored therein, the computer-readable program code portions comprising:

an executable portion that defines, for each storage tier within a tiered storage system and a selected user, storage information, wherein the storage information includes storage parameters, wherein the storage parameters include a storage quota limit of the user, usable storage capacity in the tier for the user based on the storage quota limit, and consumed storage capacity of the tier by the user;

an executable portion that defines a migration policy for determining a target storage tier, a dataset to be migrated in consideration of available target storage tier capacity for the selected user;

an executable portion that migrates files from a source storage tier to the target storage tier based on occupied storage capacity according to the target storage tier, the storage information for the target storage tier and the migration policy; and an executable portion that determines a quota consumption ratio for the selected user and the source storage tier as a ratio between the consumed storage capacity of the selected user and the usable storage capacity in the source storage tier for the selected user, the quota consumption ratio of the selected user comprising a first user being different than the quota consumption ratio of a second user; wherein the consumed storage capacity comprises a storage capacity used by the selected user in the source tier divided by a sum of capacity used by the selected user in all tiers ordered below the source storage tier in addition to the source tier; and wherein receiving of a request for migration of the dataset is performed in response to determining that the quota consumption ratio exceeds a maximum allowed used space threshold.

14. The computer program product of claim 13, further including an executable portion that:

receives a request for data storage for the selected user, wherein the received request is a request for data placement indicative of a dataset to be placed in the tiered storage system;

identifies the target storage tier of the storage tiers;

determines the dataset of the selected user to be migrated based on the received request, wherein the determined dataset is the dataset indicated in the request;

determines a data size of the dataset;

determines usable storage capacity of the target storage tier using the storage information provided for the target storage tier in association with the selected; and migrates the dataset to the target storage tier in response to determining that the data size is smaller than the determined usable storage capacity.

15. The computer program product of claim 14, further including an executable portion that identifies the target storage tier according to a descending order of the storage tiers, wherein the storage tiers are organized in a descending level of data access performance, wherein the request is a data migration request from the source storage tier, wherein the identified target storage tier has a level smaller than the level of the source storage tier.

16. The computer program product of claim 14, pursuant to determining the dataset, further selects the dataset in the source storage tier based on a predefined selection criterion, wherein the selected dataset comprises one or more data files.

17. The computer program product of claim 14, further including an executable portion that:

updates the storage information of the target storage tier in accordance with a change caused by storage of the dataset;

detects data change in the tiered storage system;

updates the storage information in accordance with the detected data change, wherein the updating comprises:
 determining the storage tier from which the file is deleted;
 re-calculating the storage parameters for the determined storage tier;
 replacing the parameters values in storage information of the determined storage tier and a user of the deleted file by the recalculated values thereby updating the storage information for the determined storage tier and the user of the deleted file; and stores the storage information as at least one data table, wherein the data table includes the storage parameters and a record of each of the storage tiers of the tiered storage system.

* * * * *